United States Patent Office 2,827,467
Patented Mar. 18, 1958

2,827,467

4-HALOGEN-2-(AMINO ALKYLAMINO)-1,3,5-TRIMETHYL-BENZENES

Heinrich Ruschig and Walter Siedel, Bad Soden, Taunus, and Heinrich Leditschke, Manfred Schorr, Dieter Schmidt-Barbo, and Georg Lammler, Frankfurt am Main, Germany, assignors to Farbwerke Hoechst Aktiengesellschaft, Frankfurt am Main, Germany, a corporation of Germany No Drawing. Application December 20, 1955
Serial No. 554,379

Claims priority, application Germany December 27, 1954

6 Claims. (Cl. 260—313)

The present invention provides compounds of the general formula

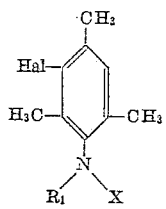

wherein Hal represents a halogen atom, $R_1$ represents a hydrogen atom or an alkyl group of low molecular weight, and X represents an aminoalkylene group the terminal amino group of which can be primary, secondary or tertiary. In the case last mentioned the tertiary amino group may form part of a heterocyclic ring system that may include the alkylene radical connecting the two nitrogen atoms, for instance, a pyrrolidine, piperidine or morpholine ring, and also acid addition salts of these compounds.

It is known that certain 2-halogen-4-aminoalkyleneamino-toluenes are effective against schistosome infections of warm-blooded animals.

Now, we have found that the compounds of the above general formula are well tolerated and exhibit an excellent activity against schistosomiasis. The invention also provides a process for the manufacture of the compounds of the above general formula, wherein one hydrogen atom bound to the nitrogen atom in a compound of the general formula

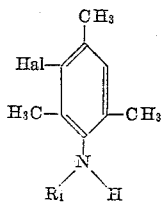

in which $R_1$ represents a hydrogen atom or an alkyl group of low molecular weight, and Hal represents a halogen atom, is exchanged, if desired, in several stages, by an aminoalkyl radical of the general formula

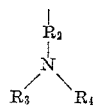

in which $R_2$ represents a straight or branched alkylene chain containing 2 to 5 carbon atoms, and $R_3$ and $R_4$ each represent a hydrogen atom or an alkyl, alkenyl or cycloalkyl radical of low molecular weight, that may contain a hydroxyl group or an alkoxy group of low molecular weight, and in which the nitrogen atom together with $R_3$ and $R_4$ or with $R_2$ and $R_4$ may form a saturated heterocyclic ring system.

The presence of a halogen atom in the 4-position and of three methyl groups in 1:3:5-position is largely responsible for the enhanced therapeutical activity of the new compounds of this invention.

The 4-halogen-2-amino-1:3:5-trimethyl-benzene may be reacted with an alkanolamine containing 2 to 5 carbon atoms, of which the chain may be branched, and of which the nitrogen atom may be alkylated or form part of a saturated heterocyclic ring system, or with a reactive ester of such an alkanolamine, if desired, in the presence of a condensing agent.

The reaction may be carried out in several stages by reacting the 4-halogen-2-amino-1:3:5-trimethylbenzene with an alkylene-halogenhydrin having a chain of 2 to 5 carbon atoms which may be branched, then converting the hydroxyl group of the resulting condensation product into a reactive ester group, reacting the latter with ammonia or a primary or secondary amine, and, when ammonia or a primary amine is used, alkylating the amino group in the usual manner.

As alkanolamines or reactive esters thereof for use in the reaction there may be mentioned, for instance, ethanolamine, dimethylaminoethyl chloride, diethylaminoethyl chloride, di-n-propylaminoethyl chloride, di-isopropylaminoethyl chloride, di-β-methoxy-ethylaminoethyl chloride, γ-dimethylamino-n-propyl-chloride, β-diethylamino-isopropyl chloride, δ-dimethylamino-n-butyl chloride, 2-chloro-3-diethylamino-butane, 1-chloro-3-diethylamino-butane and 3-chloro-4-diethylamino-pentane. As examples of compounds in which the amino group is a member of a saturated heterocyclic ring system there may be mentioned, for example, piperidino-ethyl chloride, morpholino-ethyl chloride, 2-chloro-3-piperidino-butane, pyrrolidino-ethyl chloride and N-ethyl-3-chloro-piperidine.

Dialkylaminoethyl groups of low molecular weight are especially suitable.

As an alkylene-halogenhydrin for reaction with the 4-halogen-2-amino-mesitylenes, there is especially suitable ethylene chlorohydrin. There may also be mentioned 1-chloropropanol-(3), 1-chloropropanol-(2), 1-chlorobutanol-(4), 1-chloro-butanol-(3) and 2-chlorobutanol-(3).

For making the new compounds a reactive ester of an ethanolamine, preferably containing a secondary or tertiary amino group, may be reacted with a 4-halogen-2-amino-1:3:5-trimethylbenzene, whereby the desired halogen-amino-mesitylene containing an aminoalkylene group as a substituent is formed. As reactive esters there are used preferably hydrohalic acid esters or sulphonic acid esters. The reaction may be conducted at a raised temperature, preferably between about 80° C. and 160° C., in the absence or presence of a solvent. As solvents there may be used, for example, aromatic hydrocarbons, such as benzene, toluene or xylene. The reaction may also be conducted in the presence of a condensing agent, preferably an alkali metal amide.

When the alkanolamine ester used contains a branched carbon chain, rearrangement may take place during the reaction so as to form two isomeric compounds which due to interchange of the two amino groups differ from one another as regards the position of these groups in the carbon chain (cf. Schultz, Robb and Sprague, J. Am. Soc. 69 (1947), page 188; Brode and Hill, J. Am. Soc. 69 (1947), page 724; Bockmühl and Erhart, Ann. d. Chem. 561 (1948), page 52).

Depending on the reaction conditions used, the two isomeric bases are formed in different relative proportions, so that one or other of the two compounds can be made the main product by suitably selecting the conditions of the reaction.

Instead of the reactive esters, the alkanolamines themselves may be used for the reaction with the 4-halogen-2-amino-1:3:5-trimethyl-benzenes. In this case it is advantageous to use an acid condensing agent, especially a hydrohalic acid and to work at a raised temperature, advantageously of 200° C. to 250° C.

Alternatively, the desired aminoalkyl group may be built up in stages. For this purpose a 4-halogen-2-amino-1:3:5-trimethyl-benzene may first be reacted with an appropriate alcohol or reactive ester thereof containing a substituent, for example, a further hydroxyl group, convertible into an amino group or alkylamino group. Alkylene halogenhydrins are preferably used. A raised temperature, preferably of about 110° C.–160° C., is used.

The hydroxyl group in the condensation product so obtained can be converted in the usual manner into a reactive ester group. As reactive esters there are advantageously used those of hydrohalic acids, and which can be prepared, for instance, with phosphoric acid halides, thionyl chloride or concentrated aqueous solutions of hydrohalic acids.

Conversion of the condensation product containing a reactive ester group into the desired aminoalkylene-amino-mesitylene can be brought about by treating it with ammonia or a primary or secondary amine, the presence of a condensing agent being sometimes of advantage. An excess of the amine used may serve as condensing agent. It is of advantage to work in the presence of an organic solvent, such as an aliphatic alcohol of low molecular weight. As amines for this reaction there are preferably used those of aliphatic character. If a free or a secondary amino group is present, it may, if desired, be alkylated by one of the usual methods.

If the condensation product so obtained still contains a free hydrogen atom bound to the nuclear nitrogen atom, the product may be alkylated in the usual manner, for instance, by reaction with formaldehyde coupled with hydrogenation in the presence of nickel as a catalyst.

The new compounds are colourless to yellow oils which are soluble in organic and inorganic acids and form hydrochlorides that crystallise well. As further inorganic acids there may be mentioned, for example, hydrobromic acid, hydroiodic acid, sulphuric acid, phosphoric acid and amido-sulphonic acid. As organic acids for preparing salts of the new compounds there may be mentioned, for example, formic acid, acetic acid, oxalic acid, succinic acid, malic acid, lactic acid, tartaric acid, maleic acid, citric acid, hydroxy-ethanesulphonic acid, aceturic acid, ethylene-diamine-tetraacetic acid, palmitic acid and stearic acid.

The new compounds of this invention are valuable medicaments. Coupled with good tolerability they exhibit more especially an excellent activity against schistosome infections and are superior in this respect to the known compounds. For example, a single administration per os to mice infected with Schistosoma mansoni of 30 milligrams of 4-chloro-2-diethylaminoethyl-amino-1:3:5-trimethyl-benzene hydrochloride per kilogram of body weight cures 95% of the animals.

The new compounds also exihibit a good activity against cercariae. Thus, in a concentration of 60 γ per cc. 4-chloro - 2 - ethylaminoethylamino - 1:3:5 - trimethylbenzene hydrochloride destroys the cercariae of Schistosoma mansoni in one minute.

The new compounds are also capable of influencing an experimental infection of mice with Schistosoma mansoni even during the period of pre-potency. For example, a single dose of 40 milligrams of 4-chloro-2-diethylamino-ethylamino-1:3:5-trimethylbenzene hydrochloride per kilogram of bodyweight of mouse administered per os within a period of 4 hours before the infection to 6 to 7 days subsequent to the infection with Schistosoma mansoni can prevent an intense infection of Bilharzia.

The following examples serve to illustrate the invention but they are not intended to limit it thereto:

EXAMPLE 1

*4-chloro-2-(diethylaminoethylamino)-1:3:5-trimethylbenzene*

19 grams of diethylaminoethyl chloride are added dropwise in the course of 30 minutes to a boiling solution of 23 grams of 4-chloro-2-amino-1:3:5-trimethylbenzene in 70 cc. of absolute benzene. The whole is heated for a further 5 hours under reflux, while stirring, and the solvent is distilled off. After trituration of the residue with acetone 23.5 grams of a crude product are obtained which has a melting point of 120° C. and which, after dissolution in acetone and evaporation of the solvent, yields pure 4-chloro-2-diethylamino-ethylamino-1:3:5-trimethylbenzene hydrochloride melting at 120–121° C.

EXAMPLE 2

*4-chloro-2-(diethylaminoethylamino)-1:3:5-trimethylbenzene*

450 grams of diethylaminoethyl chloride are added dropwise in the course of 2 hours at about 140–150° C., while stirring, to 509 grams of 4-chloro-2-amino-1:3:5-trimethylbenzene. The reaction mixture is then heated for five hours at 140–150° C., the reaction product is dissolved in water, the solution is rendered alkaline with dilute sodium hydroxide solution, and the precipitated base is taken up in chloroform. By drying the product over potassium carbonate and distilling it twice there are obtained 551 grams of 4-chloro-2-diethylaminoethylamino-1:3:5-trimethylbenzene boiling at 159–160° C. under a pressure of 7 mm. Hg absolute. Its para-aminosalicylate melts at 115° C. Its malonate melts at 66° C., its citrate at 116–117° C., its tartrate at 113° C. and its phosphate at 148° C.

EXAMPLE 3

*4-fluoro-2-(diethylamino-ethylamino)-1:3:5-trimethyl-benzene*

62.5 grams of diethylaminoethyl chloride are added dropwise, while stirring, at about 135° C. to 64 grams of 4-fluoro-2-amino-1:3:5-trimethyl-benzene, and the mixture is further stirred for 30 minutes at 135° C. The base is obtained by dissolving the reaction mixture in water, rendering the solution alkaline, extracting with ether, and subsequent distillation under reduced pressure. At 111–116° C. under a pressure of 0.2 mm. Hg absolute 80 grams of a colourless oil pass over which, upon dissolution in 160 cc. of ethyl acetate, neutralisation with 35 cc. of an 8.74 N-ethanolic solution of hydrochloric acid and admixture with 100 cc. of ether, yield 65 grams of 4-fluoro-2-(diethylaminoethylamino)-1:3:5-trimethyl-benzene hydrochloride melting at 93–95° C. When recrystallised from ethyl acetate the hydrochloride melts at 94.5–95.5° C. Its citrate melts at 99–105° C. and its phosphate at 122.5–124.0° C.

EXAMPLE 4

*4-bromo-2-(diethylaminoethylamino)-1:3:5-trimethylbenzene*

A solution of 107 grams of 4-bromo-2-amino-1:3:5-trimethyl-benzene in 250 cc. of absolute benzene is treated with 74.5 grams of diethylaminoethyl chloride in the manner described in Example 1. The residue is triturated with petroleum ether. 85 grams of a crude product are obtained which, when recrystallised twice from a mixture of ethyl acetate and methanol, yields pure 4 - bromo - 2 - diethylamino - ethylamino - 1:3:5-trimethyl-benzene hydrochloride melting at 135° C.

EXAMPLE 5

*4-chloro-2-(β-ethylamino-ethylamino)-1:3:5-trimethyl-benzene*

(a) *4 - chloro - 2 - (β - hydroxy - ethylamino) - 1:3:5-trimethylbenzene.*—A mixture of 85 grams of 4-chloro-2-amino-mesitylene and 32 grams of ethylene chlorhydrin is heated, while being stirred, to 120–140° C., and the reaction mixture is then introduced into a highly dilute sodium hydroxide solution. The precipitated oil is taken up in methylene chloride and the residue obtained, after drying and distillation of the solvent, is distilled under reduced pressure. 4 - chloro - 2 - (β - hydroxy - ethylamino)-mesitylene distils over at 177–180° C. under a pressure of 1 mm. Hg absolute in the form of a thick, yellow oil.

(b) *4 - chloro - 2 - (β - ethylaminoethylamino)-1:3:5-trimethyl-benzene.*—30 cc. of phosphorous oxychloride are added to a solution of 42 grams of 4-chloro-2-(β-hydroxy-ethylamino)-mesitylene in 150 cc. of benzene, and the reaction mixture is heated for 2 hours on a steam bath under reflux. After cooling it is poured into ice water, the benzene layer is washed with cold dilute bicarbonate solution, dried over sodium sulphate and, finally, the benzene is evaporated under reduced pressure. The residue is dissolved in a solution of 28 grams of ethylamine in about 1000 cc. of ethyl alcohol and heated for 6 hours in an autoclave at 150° C. After distilling off the major part of the alcohol the oil precipitated by addition of dilute caustic soda solution is taken up with ether. From this solution 4-chloro-2-(β-ethylamino-ethylamino)-mesitylene is extracted with dilute acetic acid, the base is liberated by means of caustic soda solution, taken up with methylene chloride and distilled under reduced pressure. The 4-chloro-2-(β-ethylaminoethylamino)-mesitylene distils over at 156–158° C. under a pressure of 0.5 mm. Hg absolute in the form of a light yellow oil, from which the hydrochloride is obtained in acetone solution in the form of colourless crystals melting at 163° C. The corresponding stearate melts at 38–43° C.

EXAMPLE 6

(a) *4-chloro-2-(β-bromethyl-amino)-1:3:5-trimethyl-benzene hydrobromide.*—161 grams of 4-chloro-2-(β-hydroxy-ethyl-amino)-1:3:5-trimethyl-benzene (obtained as described in Example 5a) are heated with a mixture of 720 grams of hydrobromic acid of 48 percent strength and 180 grams of concentrated sulphuric acid for 7 hours under reflux. The crystals formed after standing overnight are filtered off with suction and washed with acetone. About 220 grams of crude 4-chloro-2-(β-bromethylamino)-1:3:5-trimethyl-benzene hydrobromide are obtained, which melts at 193–196° C. and can be used as described below without further purification.

(b) *4 - chloro - 2 - (β - allylamino - ethylamino)-1:3:5-trimethyl-benzene.*—34 grams of allylamine and 36 grams of 4 - chloro - 2 - (β - bromethyl - amino) - 1:3:5-trimethyl-benzene hydrobromide are dissolved in 200 cc. of ethyl alcohol and heated for 6 hours in an autoclave at 120° C. After cooling the contents of the autoclave, they are introduced into dilute sodium hydroxide solution, and the precipitated oil is taken up with methylene chloride. After drying the solution over sodium sulphate and evaporating the solvent, the product is distilled under reduced pressure. 4-chloro-2-(β-allylamino-ethylamino)-1:3:5-trimethylbenzene distils over in the form of a light yellow oil in a yield of 19 grams at 172–174° C. under a pressure of 2 mm. Hg absolute. Its hydrochloride can be obtained by neutralizing a solution of the base in acetone with alcoholic hydrochloric acid. It crystallises in colourless needles which melt at 154–156° C. and are soluble in water.

EXAMPLE 7

*4-chloro-2-(β-N-butylamino-ethylamino)-1:3:5-trimethyl benzene*

40 grams of N-butylamine and 36 grams of 4-chloro-2 - (β - bromethylamino) - 1:3:5 - trimethyl - benzene hydrobromide (obtained as described in Example 6a) are dissolved in 200 cc. of ethyl alcohol and reacted for 6 hours at 120° C. in an autoclave. After introducing into a dilute solution of caustic soda and taking up of the base with methylene chloride, the 4-chloro-2-(β-N-butylamino-ethylamino)-1:3:5-trimethyl-benzene is distilled in the form of a yellow oil at 182–183° C. under a pressure of 2 mm. Hg absolute. The yield amounts to 19 grams. Its hydrochloride can be obtained by neutralising an acetone solution of the base and melts at 163–164° C.

EXAMPLE 8

*4-chloro-2-(β-cyclohexylamino-ethylamino)-1:3:5-trimethyl-benzene*

By reacting 38 grams of cyclo-hexylamine and 27 grams of 4 - chloro - 2 - (β - bromethyl - amino) - 1:3:5-trimethyl-benzene hydrobromide (obtained as described in Example 6a) in 150 cc. of ethyl alcohol in an autoclave at about 120° C., 4-chloro-2-(β-cyclohexylamino-ethylamino)-1:3:5-trimethyl-benzene is obtained after a reaction period of 6 hours. It distils over in the form of a yellow oil at 198–201° C. under a pressure of 1.3 mm. Hg absolute. Its hydrochloride, after precipitation from acetone in the form of colourless crystals, melts at 199–202° C.

EXAMPLE 9

*4-chloro-2-(amino-ethylamino)-1:3:5-trimethyl-benzene*

A mixture of 102 grams of 4-chloro-2-amino-1:3:5-trimethyl-benzene, 44 grams of ethanolamine and 154 cc. of hydrobromic acid of 48 percent strength is slowly heated to 190–220° C, while stirring occasionally, and maintained at that temperature for 4 hours. The cooled mass is dissolved in water and the free base is obtained by rendering the solution alkaline, extraction with ether and subsequent distillation under reduced pressure. The fraction (70 grams) distilling over at 108–117° C. under a pressure of 0.4 mm. Hg absolute is dissolved in acetone and neutralized with ethanolic hydrochloric acid. 42.4 grams of 4-chloro-2-(amino-ethylamino)-1:3:5-trimethyl-benzene hydrochloride are obtained melting at 247–250° C. After recrystallisation from methanol, the product melts at 249.5–251° C. The pure base boils at 118° C. under a pressure of 1.5 mm. Hg absolute.

EXAMPLE 10

*4-chloro-2-(diethylaminoethyl-ethylamino)-1:3:5-trimethyl-benzene*

170 grams of 4-chloro-2-amino-1:3:5-trimethyl-benzene and 106 grams of benzaldehyde are heated in an open vessel for 2 hours on the steam bath. The crude benzal compound of the 4-chloro-2-amino-1:3:5-trimethyl-benzene together with 370 grams of diethyl sulphate is then heated for five hours on a steam bath, the reaction product is diluted with 600 cc. of water, and the reaction mixture is treated with steam to drive off the benzaldehyde. When no more benzaldehyde distils over, the residue is filtered, and the base is liberated by adding sodium hydroxide solution. After being taken up in chloroform and dried over potash, the reaction product is distilled. 148 grams of 4-chloro-2-ethylamino-1:3:5-trimethyl-benzene are obtained, boiling at 129° C. under a pressure of 16 mm. Hg absolute.

99 grams of 4-chloro-2-ethylamino-1:3:5-trimethyl-benzene are heated for 5 hours at 140–150° C. with 75 grams of diethylamino-ethyl chloride. After working up as described in Example 2, there are obtained 53 grams of 4-chloro-2-(diethylaminoethyl-ethylamino)-1:3:5-trimethyl-benzene boiling at 154–156° C. under a pressure of 6 mm. Hg absolute. The hydrochloride melts at 115° C.

EXAMPLE 11

*4-fluoro-2-(diethylaminoethyl-methyl-amino)-1:3:5-trimethyl-benzene*

42 grams of 4-fluoro-2-methylamino-1:3:5-trimethyl-benzene (boiling at 108° C. under a pressure of 25 mm. Hg absolute and obtained as described in Example 10 from 4-fluoro-2-amino-1:3:5-trimethyl benzene) and 37.5 grams of diethylamino-ethyl chloride are heated for 5 hours at 130–140° C. and subjected to a further treatment as described in Example 1. 32.9 grams of 4-fluoro-2-(diethylaminoethyl-methyl-amino)-1:3:5-trimethyl-benzene boiling at 155° C. under a pressure of 17 mm. Hg absolute are obtained. Its hydrochloride melts at 143–144° C.

EXAMPLE 12

*4-chloro-2-(morpholino-ethylamino)-1:3:5-trimethyl-benzene*

83 grams of morpholinoethyl chloride are added dropwise in the course of one hour, while stirring, at about 130–140° C. to 85 grams of 4-chloro-2-amino-1:3:5-trimethyl-benzene, and the reaction mixture is then heated for a further 4 hours at 130–140° C. By working up as described in Example 2 there are obtained 77.6 grams of 4-chloro-2-(diethyl-aminoethyl-amino)-1:3:5-trimethyl-benzene in the form of a viscous oil boiling at 174–176° C. under a pressure of 5 mm. Hg absolute. Its hydrochloride melts at 148° C. and its succinate at 104–105° C.

EXAMPLE 13

*4-chloro-2-(piperidino-ethylamino-1:3:5-trimethyl-benzene*

40.5 grams of piperidinoethyl chloride are added dropwise in the course of one hour, while stirring, at 130–140° C. to 42.5 grams of 4-chloro-2-amino-1:3:5-trimethyl-benzene. By working up as described in Example 2 there are obtained 35.1 grams of 4-chloro-2-piperidino-ethylamino)-1:3:5-trimethyl-benzene boiling at 171° C. under a pressure of 6 mm. Hg absolute. Its succinate melts at 126–127° C. and its hydrochloride at 179° C.

EXAMPLE 14

*4-chloro-2-(β-pyrrolidino-ethylamino)-1:3:5-trimethyl-benzene*

37 grams of pyrrolidine and 27 grams of 4-chloro-2-(β-bromo-ethylamino)-1:3:5-trimethyl-benzene hydrobromide (obtained as described in Example 6a) are dissolved in 150 cc. of ethyl alcohol, and heated for 6 hours in an autoclave at 120° C. After introducing the reaction product into water and taking it up with methylene chloride, the 4-chloro-2-(β-pyrrolidino-ethylamino)-1:3:5-trimethyl-benzene so obtained is distilled at 186–188° C. under a pressure of 4 mm. Hg absolute in the form of a light yellow oil. It forms a hydrochloride which is obtained in the form of colourless crystals melting at 162–163° C. by neutralising a solution of the base in acetone with alcoholic hydrochloric acid.

EXAMPLE 15

*4-chloro-2-(β-hydroxy-ethyl-amino)-ethylamino-1:3:5-trimethyl-benzene*

23 grams of ethanolamine and 27 grams of 4-chloro-2-(β-bromethylamino)-1:3:5-trimethyl-benzene hydrobromide (obtained as described in Example 6a) are dissolved in 150 cc. of ethyl alcohol, and heated for 6 hours at 120° C. in an autoclave. When cold the solution is introduced into dilute sodium hydroxide solution, the oil which separates out is taken up in methylene chloride, and the solution so obtained is dried over sodium sulphate. After evaporation of the solvent the residual oil is distilled under reduced pressure, 4-chloro-2-(β-hydroxy - ethylamino) - ethylamino - 1:3:5 - trimethyl-benzene distilling over at 214–220° C. under a pressure of 6 mm. Hg absolute in the form of a thick light yellow oil. From a solution of the compound in acetone there are obtained by neutralisation with alcoholic hydrochloric acid 12 grams of its monohydrochloride in the form of colourless crystals readily soluble in water, which, after being washed with acetone and ether, melt at 137–139° C.

EXAMPLE 16

*4-chloro-2-(β-methoxyethyl-amino)ethylamino-1:3:5-trimethyl-benzene*

A mixture of 33.6 grams of 4-chloro-2-amino-ethyl-amino-1:3:5-trimethyl-benzene (obtained as described in Example 9), 16.4 grams of β-methoxy-ethyl chloride and 8 grams of calcium oxide in 200 cc. of methanol is heated for one hour at 80° C., for one hour at 110° C. and for three hours at 130° C. in a rocking autoclave. The mixture is then diluted with water, the bulk of the methanol is evaporated, and the residue is extracted with ether. By distilling the residue under reduced pressure a colourless oil is obtained from which 20 grams of the hydrochloride are obtained by dissolution in acetone and neutralisation with ethanolic hydrochloric acid. In order to purify the crude product, the latter is dissolved twice in a little methylene chloride, filtered to remove the hydrochloride of the starting material which is very sparingly soluble in methylene chloride, and the reaction product is crystallised by dilution with four times its quantity of ethyl acetate. 15 grams of pure 4-chloro-2-(β-methoxy-ethylamino) - ethylamino - 1:3:5 - trimethyl-benzene hydrochloride are obtained, melting at 112.5–113.5° C.

EXAMPLE 17

*4-chloro-2-[di-(β-methoxyethyl)]-amino-ethylamino-1:3:5-trimethyl-benzene*

84 grams of di-(β-methoxyethyl)-amino-ethyl chloride are slowly added dropwise at 130–140° C., while stirring, to 66 grams of 4-chloro-2-amino-1:3:5-trimethyl-benzene. The mass is stirred for a further 2 hours at 120° C., the cooled melt is dissolved in water, diluted with sodium hydroxide solution and extracted with ether. By distillation under reduced pressure 100 grams of 4-chloro-2-[di-(β-methoxyethyl)]-amino-ethylamino - 1:3:5 - trimethyl-benzene are obtained, boiling at 167–169° C. under a pressure of 0.3 mm. Hg absolute. By neutralising the base with ethanolic hydrochloric acid, its hydrochloride is obtained and is crystallised from ethyl acetate. It melts at 120° C. and can be recrystallised from acetone or ethyl acetate.

EXAMPLE 18

*4-chloro-2-[di-(β-ethoxyethyl)]-amino-ethylamino-1:3:5-trimethyl-benzene*

32.1 grams of di-(β-ethoxyethyl)-amino-ethyl chloride are slowly added dropwise at 130–140° C. to 22 grams of 4-chloro-2-amino-1:3:5-trimethyl-benzene. Then the reaction mixture is stirred for 2 hours at 110° C., taken up in water, rendered alkaline, and extracted with ether. By distilling the ethereal extract under reduced pressure, 35 grams of the crude product distil over at 170–173° C. under a pressure of 0.2 mm. Hg absolute. This fraction is dissolved in four times its quantity of acetone, neutralised with ethanolic hydrochloric acid, and allowed to stand at about 0° C. for one to two days. 9 grams of pure 4-chloro-2-[di-(β-ethoxyethyl)]-amino-ethyl-amino-1:3:5-trimethyl-benzene hydrochloride are obtained melting at 120.5–122° C.

EXAMPLE 19

*4-chloro-2-(γ-dimethylamino-n-propylamino)-1:3:5-trimethylbenzene*

10 grams of sodamide are suspended in a solution of 42 grams of 4-chloro-2-amino-1:3:5-trimethyl-benzene in 150 cc. of benzene and, while stirring, 32 grams of γ-dimethylamino-n-propyl chloride are added dropwise. By moderate cooling the temperature is kept at about 20° C. to 30° C. When the spontaneous evolution of heat ceases, the mass is heated for a further 1½ hours on a steam bath, and the reaction mixture is shaken with water. The benzene layer is separated off and extracted with dilute acetic acid. By rendering the mass alkaline, an oil separates out and is taken up with methylene chloride, and distilled under reduced pressure after drying the solution and distilling off the solvent. At a temperature of 163–167° C. under a pressure of 0.5 mm. Hg absolute 23 grams of 4-chloro-2-(γ-dimethylamino-n-propylamino)-1:3:5-trimethyl-benzene distil over in the form of a light yellow oil. Its monohydrochloride is obtained in the form of colourless crystals, which melt at 136° C., by neutralising a solution of the base in acetone with alcoholic hydrochloric acid.

EXAMPLE 20

(a) *4-chloro - 2 - (β-hydroxy-n-propylamino)-1:3:5-trimethyl-benzene.*—169 grams of 4-chloro-2-amino-1:3:5-trimethyl-benzene and 92 grams of 1-chloro-propanol-(2) are heated for 20 hours, while stirring, at 130–140° C., the still warm reaction mixture is diluted with water and rendered alkaline by means of sodium hydroxide solution. The oil which separates is taken up with methylene chloride and, after drying and concentrating the solution, the residue is distilled under reduced pressure, 4-chloro - 2 - (β-hydroxy-n-propylamino)-1:3:5-trimethyl-benzene distilling over at 152–157° C. under a pressure of 1.2 mm. Hg absolute in the form of a thick yellow oil, which solidifies on standing to form a light yellow crystalline mass.

(b) *4-chloro - 2 - (β-bromo-n-propylamino)-1:3:5-trimethyl-benzene hydrobromide.*—60 grams of 4-chloro-2-(β-hydroxy-n-propylamino)-1:3:5-trimethyl-benzene are heated for 8 hours under reflux together with a mixture of 300 grams of hydrobromic acid of 48 percent strength and 36 cc. of concentrated sulphuric acid. Upon cooling a dark oil separates out, in which crystals begin to form after a few days. Upon trituration the whole product solidifies. It is filtered with suction and washed with little acetone. The crude hydrobromide so obtained in the form of brown crystals can be treated as described below without further purification.

(c) *4-chloro-2-(β-diethylamino-n-propylamino)-1:3:5-trimethyl-benzene.*—29 grams of diethylamine and 30 grams of 4-chloro-2-(β-bromo-n-propylamino)-1:3:5-trimethyl-benzene hydrobromide are dissolved in 150 cc. of ethyl alcohol, and heated in an autoclave for 6 hours at 120° C. The cooled mixture is introduced into dilute caustic soda solution, the oil which separates is taken up in methylene chloride and, after being dried over sodium sulphate and distilling off the solvent, the mixture is distilled under reduced pressure. 4-chloro-2-(β-diethylamino-propylamino)-1:3:5-trimethyl-benzene distils over at 164–169° C. in the form of a yellow oil.

In order to obtain the hydrochloride a solution of the base in a little acetone is exactly neutralised with alcoholic hydrochloric acid, and, after cooling well, the salt is filtered off with suction and recrystallised from acetone. The colourless crystals melt at 150–154° C.

EXAMPLE 21

*4-chloro - 2 - (β - diethylamino-n-propylamino)-1:3:5-trimethylbenzene and 4 - chloro-2-(β-diethylamino-isopropylamino)-1:3:5-trimethyl-benzene*

42 grams of 4-chloro-2-amino-1:3:5-trimethyl-benzene and 40 grams of β-diethyl-amino-isopropyl chloride are mixed together and heated for 3 to 4 hours at 140–150° C. By treatment with dilute caustic soda solution and ether the cooled reaction mixture is dissolved. The ethereal layer is extracted with dilute acetic acid, the bases, now dissolved in the acid, are liberated by adding caustic soda solution and taking up the base with methylene chloride. After drying the solution and evaporating the solvent, the residue is distilled under reduced pressure, during which 35 grams of a mixture of 4-chloro-2-(β-diethylamino-isopropyl-amino) - 1:3:5 - trimethyl-benzene and 4-chloro - 2 - (β-diethylamino-n-propylamino)-1:3:5-trimethyl-benzene distil over at 155–162° C. under a pressure of 1 mm. of Hg absolute in the form of a yellow oil.

The mixture of the bases is dissolved in a little acetone and neutralised exactly with alcoholic hydrochloric acid. After being cooled well, the mixture of the hydrochlorides (34 grams) is filtered off with suction, treated with a large amount of boiling acetone and filtered while hot. The filtered residue is the hydrochloride of 4-chloro-2-(β-diethylamino-isopropylamino)-1:3:5-trimethyl-benzene which is sparingly soluble in acetone and is a colourless crystalline powder. The hydrochloride of the isomeric base can be obtained from the filtrate in the form of colourless crystals by concentration and cooling. After repeating this separation, 8 grams of 4-chloro-2-(β-diethylamino-isopropylamino)-1:3:5-trimethyl-benzene hydrochloride are obtained melting at 197–199° C., which is moderately soluble in cold water, and also 23 grams of 4-chloro-2-(β-diethylamino-n-propylamino)-1:3:5-trimethyl-benzene hydrochloride melting at 148–152° C., which is readily soluble in cold water.

EXAMPLE 22

*4 - chloro - 2 - (β - diethylamino - isopropylamino)-1:3:5 - trimethylbenzene and 4 - chloro - 2 (β - diethylamino-n-propylamino)-1:3:5-trimethylbenzene*

10 grams of sodamide are suspended in 150 cc. of dry benzene, 42 grams of 4-chloro-2-amino-1:3:5-trimethyl-benzene are added, and then 40 grams of β-diethylamino-isopropyl-chloride are introduced dropwise. By moderate cooling the temperature is kept at 20–30° C. When the spontaneous evolution of heat ceases, the mixture is heated for a further one or two hours under reflux, and the reaction mixture is diluted with water. The benzene layer is extracted with dilute acetic acid, and the bases are precipitated from the acid solution by adding caustic soda solution liquor and taken up in methylene chloride. By distillation there are obtained 42 grams of a mixture of the bases, which distils at 165–175° C. under a pressure of 1.4 mm. Hg absolute in the form of a yellow oil. As described in Example 21 the oil is converted into a mixture of the hydrochlorides, and the hydrochlorides are separated from each other by treatment with boiling acetone. 35 grams of 4-chloro-2-(β-diethylamino-isopropylamino)-1:3:5-trimethyl-benzene hydrochloride are obtained melting at 197–199° C. and 4 grams of 4-chloro-2 - (β - diethylamino - n - propylamino) - 1:3:5 - trimethyl-benzene hydrochloride melting at 150–152° C.

EXAMPLE 23

*4 - chloro - 2 - (1' - ethyl - 3' - piperidylamino) - 1:3:5-trimethyl-benzene*

To a suspension of 5 grams of sodamide in 75 cc. of dry benzene there are first added dropwise 18 grams of 4-chloro-2-amino-1:3:5-trimethyl-benzene and then 18 grams of 3-chloro-1-ethyl-piperidine, while stirring. Finally the mixture is heated for 2 hours on a steam bath under reflux. After being cooled, the reaction mixture is diluted with water, and the benzene layer is separated off and extracted with dilute acetic acid. The acid solution is rendered alkaline, and the base is taken up with methylene chloride. After drying the solution and distilling off the solvent, the 4-chloro-2-(1'-ethyl-3'- piperidylamino)-1:3:5-trimethyl-benzene so obtained is distilled under reduced pressure. 15 grams of this compound are obtained in the form of a yellow oil, which rapidly becomes reddish in colour, and distils at 186–187° C. under a pressure of 1.3 mm. Hg absolute.

We claim:

1. Compounds selected from the group consisting of 4-halogen-2-amino-1,3,5-trimethyl-benzenes and acid addition salts thereof, the 4-halogen-2-amino-1,3,5-trimethyl-benzenes having the general formula

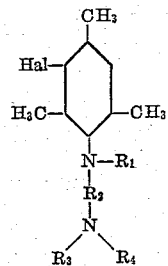

wherein Hal represents a halogen atom, $R_1$ is a member selected from the group consisting of hydrogen and alkyl radicals having at most 2 carbon atoms, $R_2$ is an alkylene group having 2–5 carbon atoms, $R_3$ and $R_4$ are members selected from the group consisting of hydrogen, alkyl, hydroxy-alkyl, alkoxy-alkyl, alkenyl, cyclohexyl radicals the alkyl and akenyl groups of which contain at most 4 carbon atoms and together with the included nitrogen atom are further members of a piperidino, pyrrolidino and morpholino group.

2. The compound of the formula

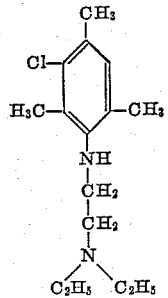

3. The compound of the formula

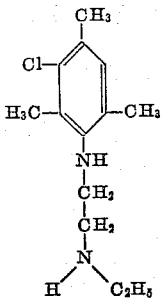

4. The compound of the formula

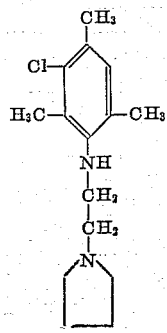

5. The compound of the formula

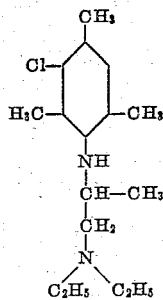

6. The compound of the formula

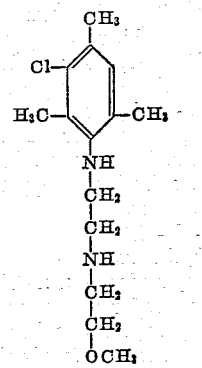

References Cited in the file of this patent
FOREIGN PATENTS

| | | |
|---|---|---|
| 913,161 | France | May 26, 1946 |
| 130,104 | Sweden | Nov. 21, 1950 |